US010378258B2

(12) United States Patent
Helmikkala

(10) Patent No.: US 10,378,258 B2
(45) Date of Patent: Aug. 13, 2019

(54) FLIPPING MECHANISM

(71) Applicant: COOLSOME OY, Espoo (FI)

(72) Inventor: Ilkka Helmikkala, Espoo (FI)

(73) Assignee: COOLSOME OY, Espoo (FI)

( * ) Notice: Subject to any disclaimer, the term of this patent is extended or adjusted under 35 U.S.C. 154(b) by 0 days.

(21) Appl. No.: 15/737,436

(22) PCT Filed: Jun. 17, 2016

(86) PCT No.: PCT/FI2016/050443
§ 371 (c)(1),
(2) Date: Dec. 18, 2017

(87) PCT Pub. No.: WO2016/203116
PCT Pub. Date: Dec. 11, 2016

(65) Prior Publication Data
US 2018/0171694 A1 Jun. 21, 2018

(30) Foreign Application Priority Data

Jun. 18, 2015 (FI) ...................................... 20155476

(51) Int. Cl.
*E05D 11/06* (2006.01)
*E05D 15/48* (2006.01)
(Continued)

(52) U.S. Cl.
CPC ............ *E05D 15/48* (2013.01); *A47B 97/001* (2013.01); *F16M 11/2014* (2013.01);
(Continued)

(58) Field of Classification Search
CPC . Y10T 16/544; Y10T 16/5445; Y10T 16/545; Y10T 16/5457; Y10T 16/54023;
(Continued)

(56) References Cited

U.S. PATENT DOCUMENTS 1,124,671 A * 1/1915 Soule ...................... E05D 15/30
16/362
1,758,893 A 5/1930 Schaffert
(Continued)

FOREIGN PATENT DOCUMENTS

WO 2007/095941 A1 8/2007

OTHER PUBLICATIONS

International Search Report, dated Sep. 30, 2016, from corresponding PCT/FI2016/050443 application.
(Continued)

*Primary Examiner* — Chuck Y Mah
(74) *Attorney, Agent, or Firm* — Young & Thompson

(57) ABSTRACT

The flipping mechanism for rotating a flat element includes a linear guide having a rail and a slide moveable along the rail, a swivel arm having a first end connected adjacent to a first end of the rail in such a way that the swivel arm can be rotated about the first end between a first position, in which the swivel arm is parallel to the rail, and a second position, in which the swivel arm is perpendicular to the rail, and a rotation element having a first end connected in a rotatable manner to the slide of the linear guide, the rotation element being further connected to the swivel arm in a rotatable manner such that rotation of the rotation element about its first end causes rotation of the swivel arm about the first end.

9 Claims, 3 Drawing Sheets

(51) Int. Cl.
*A47B 97/00* (2006.01)
*F16M 11/20* (2006.01)
*F16M 13/02* (2006.01)
*F25D 23/02* (2006.01)

(52) U.S. Cl.
CPC ........ *F16M 11/2085* (2013.01); *F16M 13/02* (2013.01); *F16M 13/022* (2013.01); *E05D 2015/485* (2013.01); *E05D 2015/487* (2013.01); *E05Y 2900/31* (2013.01); *F16M 2200/06* (2013.01); *F25D 23/021* (2013.01)

(58) Field of Classification Search
CPC . Y10T 16/54048; Y10T 16/547; E05D 15/48; E05D 2015/485; E05D 2015/487; E05D 3/18; E05D 3/06; E05D 3/12; E05D 3/14; E05D 3/16; E05D 5/04; E05D 5/02; E05D 5/046; A47B 97/001; F16M 11/2014; F16M 11/2085; F16M 13/02; F16M 13/022; F16M 2200/06; F25D 23/021
See application file for complete search history.

(56) References Cited

U.S. PATENT DOCUMENTS

| | | | | |
|---|---|---|---|---|
| 1,760,994 A * | 6/1930 | Piotti | ........................ | E06B 3/50 49/161 |
| 2,648,878 A * | 8/1953 | Albano | .................. | E05D 15/58 49/252 |
| 2,825,152 A | 3/1958 | Baylon | | |
| 3,052,931 A * | 9/1962 | Ewing | ........................ | E06B 3/50 49/176 |
| 4,007,558 A * | 2/1977 | Heggdal | ................. | E05D 15/44 49/248 |
| 5,161,321 A | 11/1992 | Kuhnke | | |
| 5,268,817 A * | 12/1993 | Miyagawa | ............ | G06F 1/1618 361/679.06 |
| 5,444,942 A * | 8/1995 | Knudsen | ............. | E05D 15/0647 49/252 |
| 5,568,703 A * | 10/1996 | Frank | ................... | E04D 13/0357 49/153 |
| 5,924,244 A * | 7/1999 | Ohman | ................... | E05D 15/44 49/248 |
| 6,598,346 B1 * | 7/2003 | Ohman | ................... | E05C 9/043 49/390 |
| 7,277,275 B2 * | 10/2007 | Won | ........................ | G06F 1/162 248/918 |
| 2007/0204499 A1 | 9/2007 | Sudack et al. | | |
| 2007/0266607 A1 | 11/2007 | Schult | | |
| 2012/0198657 A1 * | 8/2012 | Lai | ............................ | E05D 3/18 16/367 |

OTHER PUBLICATIONS

FI Search Report, dated Feb. 8, 2016, from corresponding FI20155476 application.

* cited by examiner

FLIPPING MECHANISM

Technical field of the invention

The present invention relates to a flipping mechanism for rotating a flat element.

BACKGROUND OF THE INVENTION

The need to cut costs relating to office premises is a growing trend. Effective use of business premises is thus highly valued. Therefore there is a need to design multipurpose rooms, which can easily be adapted to different needs and situations. For instance, a certain room in an office can be used for arranging internal and external meetings, parties and many other different activities. Different uses of the room require different properties from the room. For instance, whiteboards or flip charts may be needed for a brainstorming session, while good acoustics is an important characteristic of a room where lectures are given. TV-screens may be needed for a teleconference, whereas decorative panels may be more appropriate interior elements for a party. If a room is used both for internal and external meetings, there may be a need to retain notes made during an internal meeting on whiteboards for future use, while it is not desirable that the customers or other visitors attending an external meeting can see the content of the whiteboards. Therefore, there is a need to hide the whiteboards during an external meeting.

Also at homes there are situations, where something needs to be hidden from the visitors. For instance, it is common to fasten different notes, invoices and similar papers for example to the door of a refrigerator. However, some of the content of such papers may be sensitive and needs to be hidden when having guests. Even if the papers do not contain any sensitive information, a document collection on a refrigerator door is not visually appealing. Therefore, a turnable notice board with for example a decorative reverse side would be a better option. Also the reverse side of a TV could be provided with a more attractive design, which would allow hiding of the TV screen when the TV is not used.

The above examples and many other situations necessitate a flipping mechanism, to which a flat element with two sides for different purposes can be attached and which can be used for easily rotating the flat element 180 degrees to hide one side of the element and to reveal the opposite side.

Different flipping arrangements are known, but they are often complicated and difficult to use, which has prevented them from becoming more common in office and home environments. There is thus a need for a flipping mechanism, which is intuitive to use and allows easy and quick conversion of various rooms for different uses.

SUMMARY OF THE INVENTION

An object of the present invention is to provide an improved flipping mechanism for rotating a flat element. The flipping mechanism can be used for rotating a flat element between a first position and a second position, the flat element having a first side facing a first direction and a second side facing an opposite direction, wherein in the first position of the flat element the first side of the element faces a predetermined direction, and in the second position of the flat element the second side of the element faces said predetermined direction. Another object of the invention is to provide an improved furnishing or interior element.

The flipping mechanism according to the invention comprises
a first linear guide comprising a rail having a first end and a second end, and a slide moveable along the rail between the first end and the second end,
a first swivel arm having a first end and a second end, the first end being connected adjacent to the first end of the rail of the first linear guide in such a way that the swivel arm can be rotated about its first end between a first position, in which position the swivel arm is parallel to the rail of the first linear guide, and a second position, in which position the swivel arm is perpendicular to the rail of the linear guide, and
a first rotation element having a first end and a second end, the first end being connected in a rotatable manner to the slide of the linear guide, the rotation element being further connected to the swivel arm in a rotatable manner such that rotation of the rotation element about its first end causes rotation of the swivel arm about its first end.

With the flipping mechanism according to the invention, a flat element can be easily and quickly flipped around. The flipping movement is very similar to opening of a door, and the use of the flipping mechanism is thus intuitive.

According to an embodiment of the invention, the flipping mechanism further comprises
a second linear guide comprising a rail having a first end and a second end, and a slide moveable along the rail between the first end and the second end,
a second swivel arm having a first end and a second end, the first end being connected adjacent to the first end of the rail of the second linear guide in such a way that the second swivel arm can be rotated about its first end between a first position, in which position the second swivel arm is parallel to the rail of the second linear guide, and a second position, in which position the second swivel arm is perpendicular to the rail of the second linear guide, and
a second rotation element having a first end and a second end, the first end being connected in a rotatable manner to the slide of the second linear guide, the second rotation element being further connected to the second swivel arm in a rotatable manner such that rotation of the second rotation element about its first end causes rotation of the second swivel arm about its first end,
the first linear guide and the second linear guide being arranged at a distance from each other and in parallel such that a flat element can be arranged between the first rotation element and the second rotation element.

By providing the flipping mechanism with a pair of linear guides, swivel arms and rotation elements, the construction becomes more robust.

According to an embodiment of the invention, the second swivel arm is connected to the first swivel arm via a joining bar, and the first rotation element and the second rotation element are arranged to be rotatable around the joining bar. This is a simple and robust construction, which makes the flipping mechanism stronger and joins the rotation elements to the swivel arms.

According to an embodiment of the invention, the slide of the first linear guide is connected to the slide of the second linear guide. This ensures that the slides move synchronized and the flipping movement is smooth.

According to an embodiment of the invention, the slide of the first linear guide is connected to the slide of the second linear guide via a joining bar. The first rotation element and the second rotation element can be arranged to be rotatable around the joining bar.

According to an embodiment of the invention, the rotation element(s) is/are connected to the swivel arm(s)) at a distance from the first end(s) of the swivel arm(s) equaling approximately half of the length of the rail(s) of the linear guide(s).

According to an embodiment of the invention, the length of the swivel arm(s) is approximately half of the length of the linear guide(s) and the rotation element(s) is/are connected to the second end(s) of the swivel arm(s).

A furnishing or an interior element according to the invention comprises a flipping mechanism defined above and a flat element attached to the flipping mechanism such that the rotation of a rotation element from the first position to the second position rotates the flat element from the first position to the second position.

According to an embodiment of the invention, the flat element forms the rotation element(s).

The sides of the flat element can form, for instance, an acoustic panel, a whiteboard or a TV or computer screen.

BRIEF DESCRIPTION OF THE DRAWINGS

Embodiments of the invention are described below in more detail with reference to the accompanying drawings, in which.

DESCRIPTION OF EMBODIMENTS OF THE INVENTION

A flipping mechanism according to one embodiment of the invention is shown in the figures.

The flipping mechanism can be used for rotating a flat element 1 around its axis. In the embodiment of the figures, the flat element 1 is rotated around a vertical axis. However, the axis around which the flat element 1 is rotated could also be horizontal. The flat element 1 has a first side 1a and a second side 1b. The sides 1a, 1b of the flat element 1 face opposite directions. The first side 1a and the second side 1b form the largest surfaces of the flat element 1. The second side 1b of the flat element 1 can be identical to the first side 1a of the flat element 1, or alternatively the sides 1a, 1b can have different surfaces. As an example, the first side 1a of the flat element 1 could form a whiteboard and the second side 1b of the flat element 1 could form a whiteboard or an acoustic panel. Other examples of suitable uses of the first side 1a and the second side 1b of the flat element 1 include, for example, TV/computer screen, decorative panel, bulletin board, painting, blackboard and many other uses. Together the flipping mechanism and the flat element 1 form a furnishing or an interior element, which can be used at offices, homes, factories, restaurants etc. The furnishing element could be fixed to a wall, or it could be provided with supports allowing it to be used as a space-dividing element. It could also be hung from a ceiling. The element could also be used as a floor element or a ceiling element. Depending on the materials chosen, it could also be suitable for outdoor use.

Figure 1:
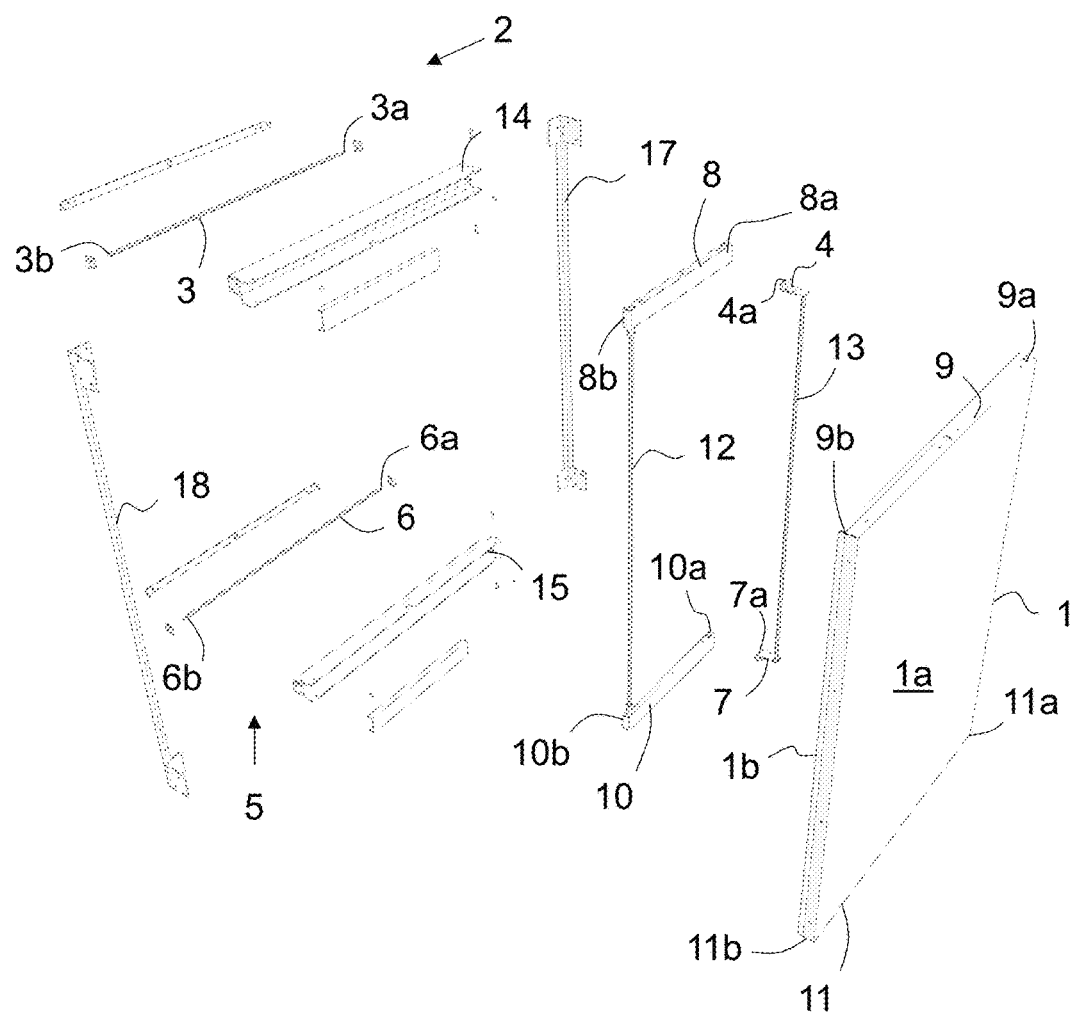
FIG. 1 shows an exploded view of a furnishing element comprising a flipping mechanism according to an embodiment of the invention.
Figure 2:
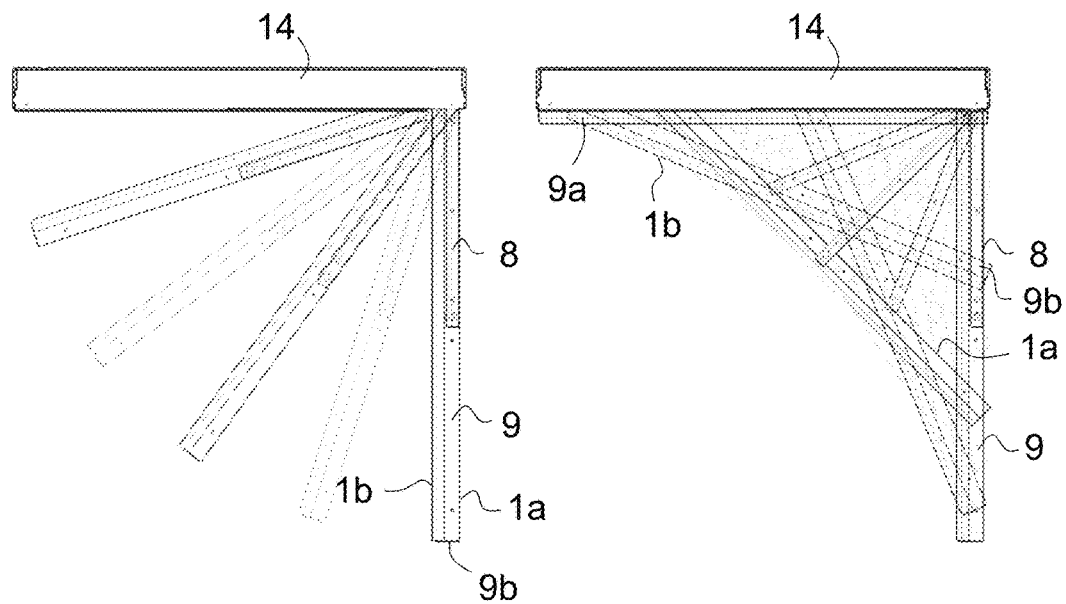
FIG. 2 shows from a top view how a flat element is flipped from a first position to a second position.

FIG. 1 shows an exploded view of a flipping mechanism according to an embodiment of the invention. Some of the parts are also visible in FIGS. 2 to 4. A flat element 1 is attached to the flipping mechanism, and in this embodiment it also forms an integral part of the flipping mechanism. The flipping mechanism comprises a first linear guide 2 and a second linear guide 5. In the embodiment of FIG. 1, the first linear guide 2 is an upper linear guide and the second linear guide 5 is a lower linear guide. However, the flipping mechanism could also work in another position, and the linear guides 2, 5 could thus be on the sides of the flipping mechanism. Each linear guide 2, 5 comprises a rail 3, 6 and a slide 4, 7. Each rail 3, 6 has a first end 3a, 6a and a second end 3b, 6b and the slide 4, 7 can move along the rail 3, 6 between the ends of the rail 3, 6. The linear guide 3, 6 is provided with stoppers at each end limiting the movement of the slide 4, 7. In the embodiment of FIG. 1, the linear guides 2, 5 are identical, but it should be noted that the first linear guide 2 and the second linear guide 5 can also differ from each other. In the embodiment of FIG. 1, the rail 3, 6 of the linear guide 2, 5 is a round bar. The slide 4, 7 comprises a sleeve 4a, 7a, which can slide along the bar 3, 6. However, many other types of rail/slide combinations are possible. For instance, the rail 3, 6 could comprise a slot, in which a slide is arranged to move. The rail 3, 6 could also have a rectangular or some other cross-sectional shape. The rail 3, 6 could also be a ball screw or a ball screw. The slide 4, 7 could be provided with balls, rolls or other rolling elements for reducing friction between the slide 4, 7 and the rail 3, 6. Each of the linear guides 2, 5 comprises a support element 14, 15, to which the rail 3, 6 is attached. The support elements 14, 15 are connected to a first end beam 17 and a second end beam 18. The first end beam 17 connects the first ends of the linear guides 2, 5 together and the second end beam 18 connects the second ends of the linear guides 2, 5 together. The end beams 17, 18 together with the support elements 14, 15 form a frame for the flipping mechanism. The frame can be better seen in FIGS. 3 and 4. The support elements 14, 15 and the end beams 17, 18 are not necessary parts of the flipping mechanism. For instance, with a suitable rail type, the rails 3, 6 of the linear guides 2, 5 could be attached directly to a wall of a building. However, due to the end beams 17, 18, the flipping mechanism forms a module, which is easy to mount onto a wall or a similar construction. The length of the linear guides 2, 5 is approximately the same as the width of the flat element 1.

The flipping mechanism further comprises a first swivel arm 8 and a second swivel arm 10. The first swivel arm 8 is an upper swivel arm and the second swivel arm 10 is a lower swivel arm. If the flipping mechanism was rotated 90 degrees, the swivel arms 8, 10 would be on the sides of the flipping mechanism. Each swivel arm 8, 10 has a first end 8a, 10a and a second end 8b, 10b. In the embodiment of FIG. 1, the swivel arms 8, 10 are attached to each other via a joining bar 12. However, it is not necessary to attach the swivel arms 8, 10 together. The joining bar 12 is connected to each swivel arm 8, 10 at the second end 8b, 10b. Each swivel arm 8, 10 is connected to the respective linear guide 2, 5 adjacent to the first end 3a, 6a of the rail 3, 6 of the linear guide 2, 5. However, it should be noted that the swivel arms 8, 10 do not need to be connected to the linear guides 2, 5, but it is sufficient that the swivel arms 8, 10 are connected in the proximity of the ends of the rails 3, 6 of the linear guides 2, 5. For instance, the flipping mechanism could be provided with a separate frame, to which both the linear guides 2, 5 and the swivel arms 8, 10 are connected, or the swivel arms 8, 10 could be connected directly to a wall. The connection allows the swivel arm 8, 10 to rotate between a first position and a second position. In the first position, the swivel arm 8, 10 is parallel to the linear guide 2, 5 and the second end 8b, 10b points towards the second end 3b, 6b of the linear guide 2, 5. In the second position, the swivel arm 8, 10 is perpendicular to the linear guide 2, 5. The swivel arm 8, 10 thus points outwards from the plane defined by the linear guides 2, 5. The end beams 17, 18 prevent the movement of the swivel arms 8, 10 beyond the position where the swivel arms 8, 10 are perpendicular to the linear guides 2, 5. The movement of the swivel arms 8, 10 is thus restricted to the range between the first position and the second position. Also some other kind of restrictors could be used for limiting the range within which the swivel arms 8, 10 can rotate. The length of each swivel arm 8, 10 is half of the length of the rail 3, 6 of the linear guide 2, 5. This is the minimum length for the swivel arms 8, 10. However, the swivel arms 8, 10 could also be longer.

The flipping mechanism comprises a first rotation element 9 and a second rotation element 11, each having a first end 9a, 11 a and a second end 9b, 11 b. The first end 9a of the first rotation element 9 is connected to the slide 4 of the first linear guide 2. The first end 11a of the second rotation element 11 is connected to the slide 7 of the second linear guide 5. The rotation elements 9, 11 are connected to the slides 4, 7 of the linear guides 2, 5 in a rotatable manner. The rotation elements 9, 11 can thus rotate about the connection points. Each rotation element 9, 11 can rotate in a plane that is parallel to the planes in which the swivel arms 8, 10 can rotate. In the embodiment of FIG. 1, the slide 7 of the second linear guide 5 is connected to the slide 4 of the first linear guide 2 via a joining bar 13. The first ends 9a, 11 a of the rotation elements 9, 11 are provided with holes, through which the joining bar 13 is inserted, and the rotation elements 9, 11 can thus rotate around the joining bar 13. However, it is not necessary to connect the slides 4, 7 together. If the slides 4, 7 are not connected to each other, the slides 4, 7 could be provided with shorter pivots for connecting the rotation elements 9, 11 to the slides 4, 7 of the linear guides 2, 5. Alternatively, the rotation elements 9, 11 could be provided with pivots and the slides 4, 7 could be provided with respective holes. In the embodiment of FIG. 1, the rotation elements 9, 11 are integrated with the flat element 1. The upper end of the flat element 1 forms the first rotation element 9 and the lower end of the flat element 1 forms the second rotation element 11. However, it is obvious that the rotation elements 9, 11 could be separate parts, to which the flat element 1 is attached.

The rotation elements 9, 11 are also connected to the swivel arms 8, 10 in a rotatable manner. The rotation elements 9, 11 are connected to the swivel arms 8, 10 in such a way, that each rotation element 9, 11 can rotate about the connection point, which is in the middle of the rotation element 9, 11 between the first end 9a, 11a and the second end 9b, 11b. In the embodiment of the figures, the rotation elements 9, 11 are connected to the second ends 8b, 10b of the swivel arms 8, 10. However, the swivel arms 8, 10 could also be longer, in which case the rotation elements 9, 11 would be connected to the swivel arms 8, 10 at such a distance from the first ends 8a, 10a of the swivel arms 8, 10, which equals half of the length of the rails 3, 6 of the linear guides 2, 5. The length of the rotation elements 9, 11 is at least half of the length of the rails 3, 6 of the linear guides 2, 5. However, preferably the length of the rotation elements 9, 11 is approximately the same as the length of the rails 3, 6. In the embodiment of the figures, the rotation elements 9, 11 are arranged to rotate around the joining bar 12 connecting the swivel arms 8, 10 together. However, in case the flipping mechanism is not provided with the joining bar 12, either the swivel arms 8, 10 or the rotation elements 9, 11 could be provided with pivots and the counterparts could be provided with respective holes cooperating with the pivots for allowing the rotation elements 9, 11 to rotate in respect of the swivel arms 8, 10.

The functioning of the flipping mechanism and the furnishing element is described below. The movement of the flat element 1 from the first position to the second position can be seen in FIG. 2. In the described example, the furnishing element is attached to a wall. In the first position of the flat element 1, the first side 1a of the flat element 1 is positioned outwards and the second side 1b of the flat element 1 faces the wall. The swivel arms 8, 10 of the flipping mechanism are parallel to the rails 3, 6 of the linear guides 2, 5. The second ends 8b, 10b of the swivel arms 8, 10 point towards the second ends 3b, 6b of the rails 3, 6. The slides 4, 7 of the linear guides 2, 5 are at the first ends 3a, 6a of the rails 3, 6. The first ends 9a, 11 a of the rotation elements 9, 11 are aligned with the first ends 3a, 6a of the rails 3, 6 and the second ends 9b, 11 b of the rotation elements 9, 11 are aligned with the second ends 3b, 6b of the rails 3, 6.

Figure 3:
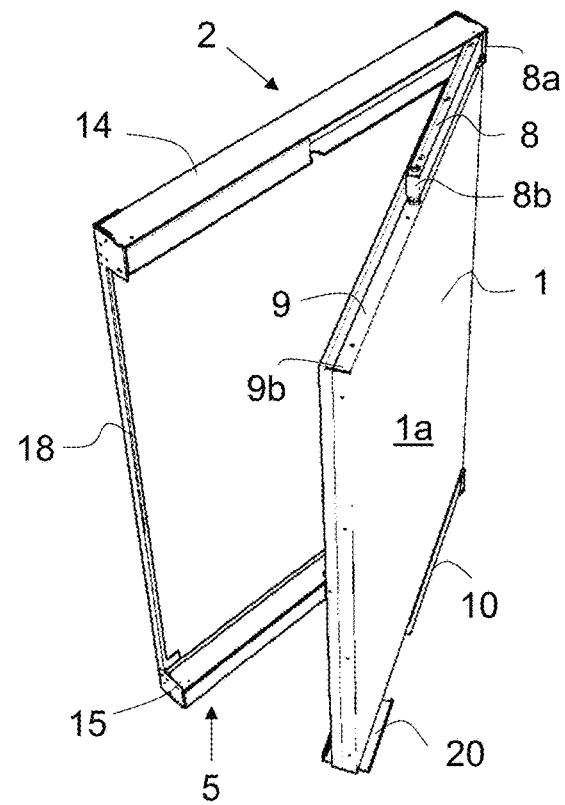
FIG. 3 shows a perspective view of a furnishing element during a flipping movement.
Figure 4:
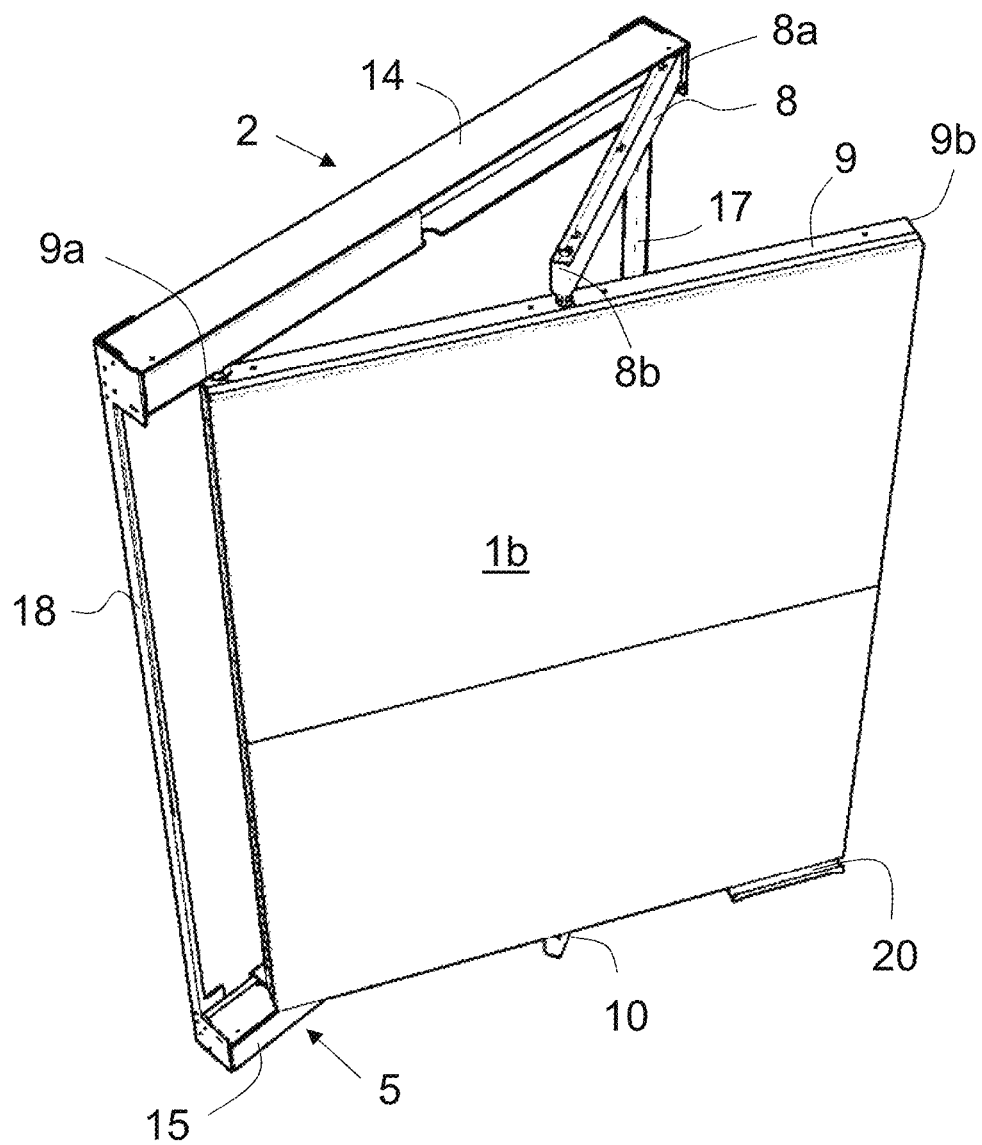
FIG. 4 shows a perspective view of the furnishing element of FIG. 3 during a flipping movement but at a different phase.

The flipping of the flat element 1 is started by grabbing that edge of the flat element 1 which is located between the second ends 9b, 11 b of the rotation elements 9, 11. FIGS. 3 and 4 show a handle 20, which can be used for grabbing the flat element 1 and also indicates the rotation direction of the flat element 1. The flat element 1 is turned with a movement similar to opening of a door. The rotation elements 9, 11 start to rotate about their first ends 9a, 11a around the joining bar 13 connecting the slides 4, 7 of the linear guides 2, 5. Seeing from the above, the rotation elements 9, 11 rotate counter clockwise. At this point, the slides 4, 7 of the linear guides 2, 5 do not move. The swivel arms 8, 10 are connected to the rotation elements 9, 11 via the joining bar 12 and turn together with the flat element 1 and the rotation elements 9, 11 until the flat element 1, the rotation elements 9, 11 and the swivel arms 8, 10 are perpendicular to the linear guides 2, 5. At this point, further rotation of the swivel arms 8, 10 in that direction is prevented, but the rotation elements 9, 11 and the flat element 1 are allowed to turn further around the pivot points connecting the rotation elements 9, 11 to the swivel arms 8, 10. Because the further rotation of the swivel arms 8, 10 is prevented and the rotation elements 9, 11 continue the rotating movement, the slides 4, 7 at the first ends 9a, 11 a of the rotation elements 9, 11 are forced to start moving towards the second ends 3b, 6b, of the rails 3, 6 of the linear guides 2, 5. The movement of the slides 4, 7 forces the swivel arms 8, 10 to rotate in the opposite direction compared to the initial rotation direction. The swivel arms 8, 10 thus rotate clockwise. Rotation of the rotation elements 9, 11 is continued until the slides 4, 7 have reached the second ends 3b, 6b of the rails 3, 6 of the linear guides 2, 5. At this point, the swivel arms 8, 10, the rotation elements 9, 11 and the flat element 1 are again parallel to the linear guides 2, 5. Now the second side 1b of the flat element 1 is outwards and the first side 1a faces the wall. The first ends 9a, 11 a of the rotation elements 9, 11 are aligned with the second ends 3b, 6b of the rails 3, 6 of the linear guides 2, 5.

To flip the flat element 1 in the opposite direction from the second position to the first position, the edge of the flat element 1 between the first ends 3a, 6a of the rails 3, 6 of the linear guides 2, 5 is grabbed. Again, the movement rotating the flat element 1 is similar to opening of a door. This time, the flat element 1 is turned in an opposite direction compared to the flipping from the first position to the second position. Seeing from the above, the rotation elements 9, 11 are thus rotated clockwise. The rotation elements 9, 11 start turning around the joining bar 13 connecting the slides 4, 7 of the linear guides 2, 5. Since the rotation elements 9, 11 are connected to the swivel arms 8, 10, they force the swivel arms 8, 10 to rotate about the connection points at the first ends 8a, 10a of the swivel arms 8, 10. The swivel arms 8, 10 rotate in an opposite direction compared to the rotation elements 9, 11. The swivel arms 8, 10 pull the rotation elements 9, 11, and the slides 4, 7 of the linear guides 2, 5 are forced to move towards the first ends 3a, 6a of the rails 3, 6 of the linear guides 2, 5. When the slides 4, 7 have reached the first ends 3a, 6a of the rails 3, 6, the rotation elements 9, 11 and the swivel arms 8, 10 are perpendicular to the rails 3, 6. As the rotation of the rotation elements 9, 11 continues, the swivel arms 8, 10 are forced to rotate together with the rotation elements 9, 11. The rotation direction of the swivel arms 8, 10 is thus changed. The movement continues until the rotation elements 9, 11, swivel arms 8, 10 and the flat element 1 are parallel to the linear guides 2, 5. The first side 1a of the flat element 1 is outwards and the second side 1b faces the wall.

Above has been described a furnishing element with manual flipping operation. The flipping operation could also be motorized. Preferably, the drive of the furnishing element is implemented by arranging a motor to drive at least one of the slides 4, 7 of the linear guides 2, 5. The rail 3, 6 of a linear guide 2, 5 could be a rotatable screw that is rotated by an electric motor. Alternatively, the slide 4, 7 could be belt-driven, for instance by a toothed belt or a V-belt.

It will be appreciated by a person skilled in the art that the invention is not limited to the embodiments described above, but may vary within the scope of the appended claims. For instance, although an embodiment with a pair of linear guides, swivel arms and rotation elements has been described above, the invention could also be implemented with a single linear guide, swivel arm and rotation element.

The invention claimed is:

1. A flipping mechanism for rotating a flat element between a first position and a second position, the flat element having a first side facing a first direction and a second side facing an opposite direction, in the first position of the flat element, the first side of the element facing a predetermined direction, in the second position of the flat element, the second side of the element facing said predetermined direction, the flipping mechanism comprising: at least one linear guide, each of the at least one linear guide comprising
   a rail having a first end and a second end, and
   a slide moveable along the rail between the first end and the second end;
   a first swivel arm having a first end and a second end, the first end of the first swivel arm being connected adjacent to the first end of the rail of the linear guide such that the first swivel arm is rotatable about the first end of the first swivel arm between a first position, in which the first swivel arm is parallel to the rail of the at least one linear guide, and a second position, in which the first swivel arm is perpendicular to the rail of the at least one linear guide;
   a first rotation element having a first end and a second end, the first end of the first rotation element being connected in a rotatable manner to the slide of the at least one linear guide, the first rotation element being further connected to the first swivel arm in a rotatable manner such that rotation of the first rotation element about the first end of the first rotation element causes rotation of the first swivel arm about the first end of the first swivel arm;
   a second swivel arm having a first end and a second end, the first end of the second swivel arm being parallel to the first swivel arm such that the second swivel arm is rotatable about the first end of the second swivel arm between a first position, in which the second swivel arm is parallel to the rail of the at least one linear guide, and a second position, in which the second swivel arm is perpendicular to the rail of the at least one linear guide; and
   a second rotation element having a first end and a second end, the second rotation element being connected to the second swivel arm in a rotatable manner such that rotation of the second rotation element about the first end of the second rotation element causes rotation of the second swivel arm about the first end of the second swivel arm,
   wherein the second swivel arm is connected to the first swivel arm via a first joining bar, and
   the first rotation element and the second rotation element are rotatable around the first joining bar.

2. The flipping mechanism according to claim 1, wherein the at least one linear guide includes a first linear guide, and a second linear guide,
   the first end of the second swivel arm is connected adjacent to the first end of the rail of the second linear guide such that the second swivel arm is rotatable about the first end of the rail of the second linear guide between a first position, in which the swivel arm is parallel to the rail of the second linear guide, and a second position, in which the second swivel arm is perpendicular to the rail of the second linear guide and
   the first end of the second rotation element being connected in a rotatable manner to the slide of the second linear guide
   the first linear guide and the second linear guide are disposed at a distance from each other and in parallel such that the flat element is able to be disposed between the first rotation element and the second rotation element.

3. The flipping mechanism according to claim 2, wherein the slide of the first linear guide is connected to the slide of the second linear guide.

4. The flipping mechanism according to claim 2, wherein the slide of the first linear guide is connected to the slide of the second linear guide via a second joining bar.

5. The flipping mechanism according to claim 4, wherein the first rotation element and the second rotation element are rotatable around the second joining bar.

6. The flipping mechanism according to claim 1, wherein the first and second rotation elements are connected to the first and second swivel arms at a distance from the first ends of the first and second swivel arms equaling approximately half of the length of the rail of the at least one linear guide.

7. The flipping mechanism according to claim 1, wherein the length of the first and second swivel arms is approximately half of the length of the at least one linear guide and the first and second rotation elements are connected to the second ends of the first and second swivel arms.

8. A furnishing or an interior element comprising:
the flipping mechanism according to claim 1; and
the flat element attached to the flipping mechanism such that the rotation of the first and second rotation elements from the respective first position to the second position rotates the flat element from the first position to the second position of the flat element.

9. The furnishing or an interior element according to claim 8, wherein the flat element forms the first and second rotation elements.

* * * * *